United States Patent [19]

Mills

[11] 4,093,349
[45] June 6, 1978

[54] HIGH REFLECTIVITY LASER MIRRORS

[75] Inventor: George J. Mills, Santa Ana, Calif.

[73] Assignee: Northrop Corporation, Los Angeles, Calif.

[21] Appl. No.: 736,157

[22] Filed: Oct. 27, 1976

[51] Int. Cl.² .............................................. G02B 5/08
[52] U.S. Cl. ...................................... 350/288; 204/7; 204/292; 331/DIG. 1
[58] Field of Search ................... 350/320, 288, 186; 204/7, 292, 19, 192 C, 19 R, 43, 43 S, 40, 192 R, 126, 436; 331/94.5 A

[56] References Cited

U.S. PATENT DOCUMENTS

| | | | |
|---|---|---|---|
| 2,131,187 | 9/1938 | Liebmann | 204/192 C |
| 2,305,050 | 12/1942 | Wise et al. | 204/7 |
| 2,352,283 | 6/1944 | Overholt, Jr. | 204/192 C |
| 2,519,722 | 8/1950 | Turner | 350/320 |
| 3,149,058 | 9/1964 | Parker et al. | 204/43 G |
| 3,378,469 | 4/1968 | Jochim | 204/7 |
| 3,428,533 | 2/1969 | Pichel | 204/7 |
| 3,437,888 | 4/1969 | Hall | 204/192 C |

Primary Examiner—John K. Corbin
Assistant Examiner—B. W. de los Reyes
Attorney, Agent, or Firm—Willard M. Graham; William W. Rundle

[57] ABSTRACT

A mirror for high power lasers comprising a high reflectivity superlattice surface formed of a copper-gold alloy on a copper base, and the method of making the same.

15 Claims, 8 Drawing Figures

HIGH REFLECTIVITY LASER MIRRORS

BACKGROUND OF THE INVENTION

Mirrors for high power lasers require high reflectivity approaching 100%, high thermal conductivity to dissipate heat absorbed at the surface, and a tarnish free, highly polished surface. By highly polished surface, I mean a surface having relatively low rms (root mean square) roughness, i.e., rms is a statistic which numerically quantifies the variation in surface displacement or deviation from a perfect plane over a distance on the surface and which, for a highly polished reflective metallic mirror, is typically less than 15 A rms.

Currently available mirrors of the type used in laser systems are generally manufactured of materials which amount to a compromise of the basic requirements enumerated above. That is to say, currently available materials that have been used, or proposed for use, in laser mirrors fail to meet the basic requirements for reasons such as softness, loss of reflectance in alloying, susceptibility to corrosion and tarnishing, warping or distortion, expense, or complexity of manufacture.

DESCRIPTION OF THE PRIOR ART

Examples of prior art mirrors proposed for use with lasers are disclosed in U.S. Pat. Nos. 3,609,589 (Hufnagle), 3,628,178 (Treacy), and 3,660,776 (Yamaka et al).

In each of the above prior art patents, thin films of tungsten, copper, gold, silver, or aluminum are deposited on a mirror base or substrate. However, none of the prior art patents disclose or suggest a laser mirror surfaced with a copper-gold alloy film or layer which has been transformed into a face-centered cubic lattice structure.

It is known that alloyed copper yields excellent reflectance (substantially 99.1+), has higher strength, is relatively tarnish and corrosion resistant, and polishes more satisfactorily than pure copper. With copper as a base metal, alloying elements are readily available which do not appreciably increase electrical resistivity, and which provide an increase in hardness approaching a covalent or ionic bond, and further retain the high thermal conductivity of the base metal without need of a protective coating, which elements make super-reflecting mirror surfaces possible.

Certain alloys which normally form into a random or disordered atomic positioning of the constituents in the standard densely packed crystal structures can, through heat treatment, be transformed into a superstructure or superlattice wherein the atoms are ordered or preferentially located into certain lattice positions. These so called superlattice structures impart unusual properties to the alloy. This is particularly true with the face centered cubic lattice structure since these alloys exhibit the highest thermal and electrical conductivities. On the other hand, normal alloying, or impurity additions, introduces electron scattering with a resultant decrease in these conductivities even though the basic crystal structure remains unchanged, and therefore are not ideally suitable for high power laser mirrors.

Superlattices, however, typically are highly resistant to corrosion or tarnishing due to the altered electron configuration and semi-metallic bonding.

It is an object of my invention to provide a mirror that is highly reflective, tarnish resistant, and which possesses unusually high thermal conductivity and structural strength.

It is a further object of my invention to provide a highly reflective mirror that is especially suitable for high power lasers.

SUMMARY OF THE INVENTION

A mirror for high power lasers comprising a superlattice structure formed in a layer of a copper-gold alloy on a base structure.

DESCRIPTION OF THE PREFERRED EMBODIMENTS

Figure 1:
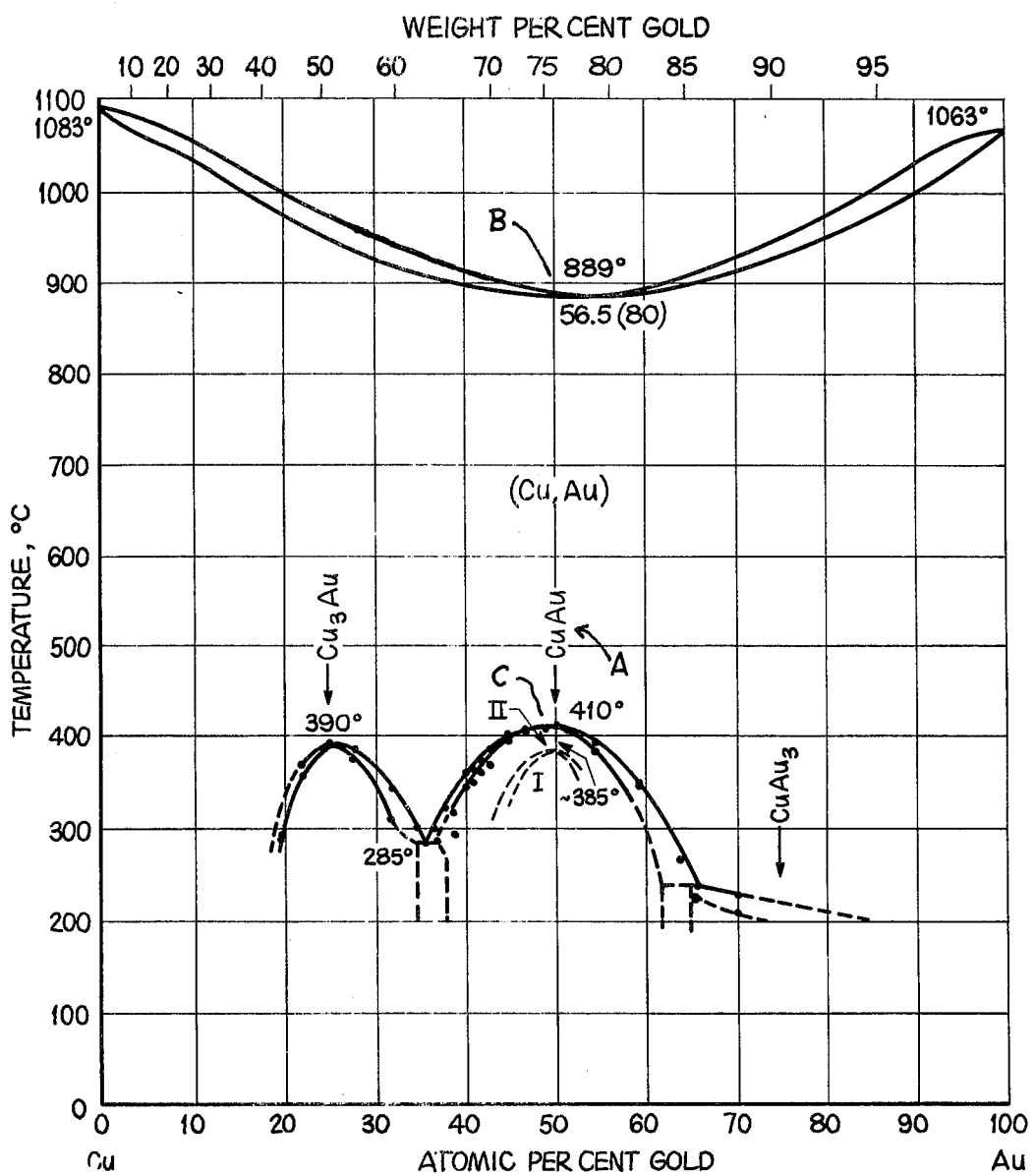
FIG. 1 is a graphic illustration of the copper-gold equilibrium phase diagram showing solidification curves and the solid state compound formation phase boundaries for various copper-gold alloy compositions.

Copper alloyed with gold and processed by cooling from the melt forms an alloy in which the elements are completely miscible, producing an isomorphous equilibrium state over the entire composition range substantially as shown by the region marked (Cu,Au) covering approximately from 400° C. to 900° C. and zero to 100 atomic percent gold in the equilibrium phase diagram of FIG. 1. For example, a gold-copper alloy with 50 atomic percent gold indicated at A, melts at about 890° C. as indicated at B and upon cooling to below this temperature, solidifies into a single phase state where the gold and copper atoms are randomly located in the face centered cubic structure lattice sites. This equilibrium state persists as the temperature is lowered to about 410° C. indicated at C. Other alloy compositions solidify to the same state, however, the temperature differs as shown in the phase diagram of FIG. 1 wherein the $Cu_3Au$ alloy solidifies at about 950° C. and the face centered cubic structure lattice containing three copper and one gold atoms randomly located at the atom sites presets at temperatures down to about 390° C.

Figure 2:
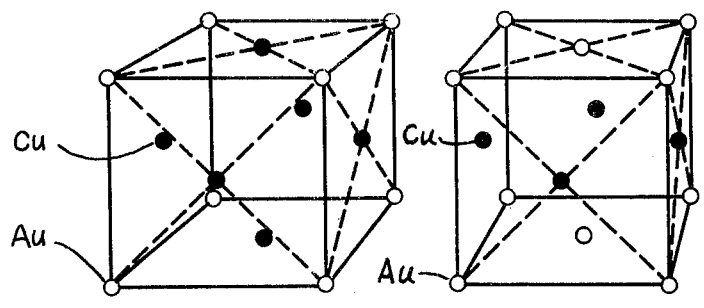
FIG. 2 is a series of diagrams illustrating the superlattice atom structure of the alloy utilized in the device of the invention.

When the solidified isomorphous alloys with the compositions $Cu_3Au$ (25 atomic % gold) and CuAu (50 atomic % gold) are heat treated from an intermediate temperature of around 390° C. and 410° C. respectively, and lower, and then quenched to room temperature, ordered structures develop substantially as shown in FIG. 2. The $Cu_3Au$ structure has the gold atoms located at the corners of the face centered cube and the copper atoms at the center of the faces (as shown in FIG. 2A) to preserve the 3 copper to 1 gold atom stoichiometry relationship. The CuAu structure has the copper atoms at the four planar face centers and the gold atom at the remaining lattice sites (as shown in FIG. 2B) to preserve the 1 copper 1 gold stoichiometry relationship.

Figure 3:
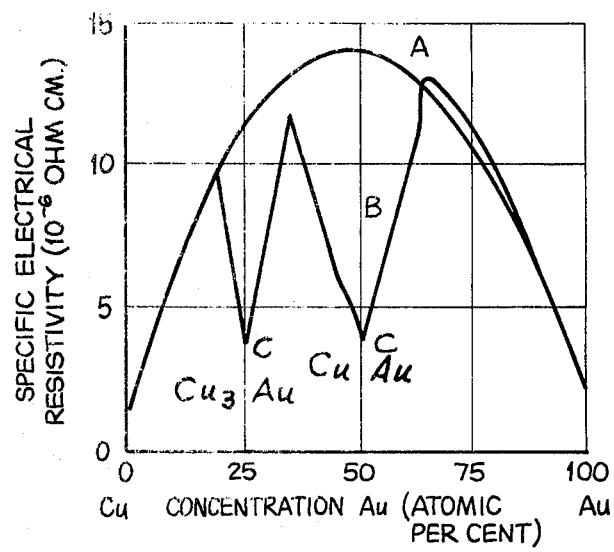
FIG. 3 is a graph illustrating the electrical resistivity of copper-gold alloys as a function of the composition thereof.

The resultant ordered alloy possesses properties that are distinctly different from both the base metals and the disordered, random alloy structures. Therefore, these alloys possess ideal properties and characteristics for high power laser mirrors, i.e., hardness for polishing, tensile strength for resistance to thermal shock, and low electrical resistivity for reflectivity. Variations in electrical resistivity for the various ordered alloy compositions are shown in the graphs of FIG. 3, an ordered $Cu_3Au$ alloy with 25 atomic percent gold or a CuAu alloy with a 50 atomic percent gold composition having electrical resistivity minima at C that are very similar to the elements copper or gold. Graph "A" shows variations in resistivity when the alloys were quenched from 650° C. and where the atomic structure was random, and Graph "B", shows variations where the alloys were annealed at 200° C. to produce an ordered structure. According to the Widemann-Franz Law, the thermal conductivity of ordered $Cu_3Au$ and CuAu alloys will also not differ significantly from the base metals of Cu and Au.

The function and theory supporting the above structures is discussed in:

"Introduction to Physics of Metals and Alloys", W. Boas, John Wiley & Sons, 1947; "Constitution of Binary Alloys", Max Hansen, McGraw-Hill Book Co., 1958; and "Physics of Metals", Frederick Seitz, McGraw-Hill Book Co., 1943.

Figure 4:
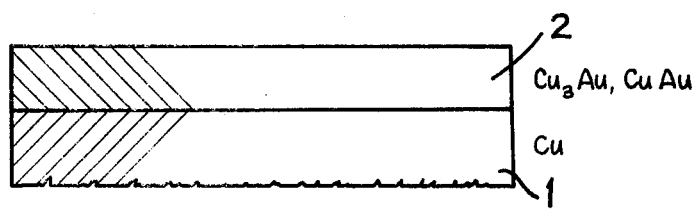
FIG. 4 is an elevational view illustrating a first embodiment of the invention.

Applying the transformation techniques described above to the manufacture of metallic mirrors for high power lasers, examples of surface structures suitable for high power laser mirrors and the methods for forming such structures are as follows:

Example I: As shown in FIG. 4, polish a copper mirror substrate 1 and deposit, by sputtering, vapor deposition or plating, a 1 mil or greater layer 2 of CuAu or $Cu_3Au$ alloy. Heat the assembly to between 200° C. for 15 days or 390° C. for 2 hours to fully develop the ordered state and cool to room temperature. Longer heating times of say 100 hours at 390° C. will coarsen the superlattice cell or domain size, a condition which will further decrease the electrical resistivity. The layer 2 may then be etched with suitable etchants well known in the art and finished with a final polish to obtain maximum reflectivity. The surface structure will be somewhat as shown.

Figure 5:
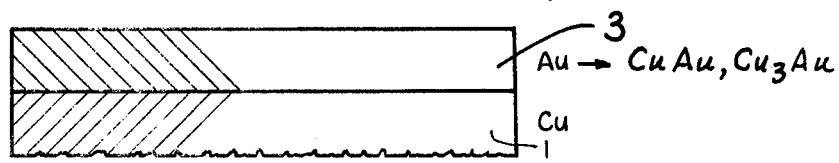
FIG. 5 is an elevational view illustrating a second embodiment of the invention.

Example II: As shown in FIG. 5, polish the copper mirror substrate 1 and deposit, by vapor deposition sputtering, or plating a 1 mil layer 3 of gold. Heat treat the assembly to a temperature between 450° C. for 40 days or 750° C. for 10 hours to diffuse the gold into the copper and until a surface composition of $Cu_3Au$ or CuAu is attained, then, by slowly cooling and holding to between 200° C. for 15 days or 390° C. for 2 hours and then quenching, a superlattice structure is formed on the surface. This can be etched and finished by polishing for maximum reflectivity. The surface structure will be somewhat as shown in the Figure.

Figure 6A:
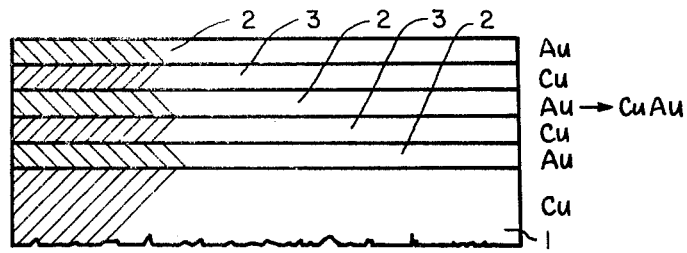
FIG. 6A is an elevational view illustrating a third embodiment of the invention.

Example IIIA: As shown in FIG. 6A, polish a copper mirror substrate 1 and then deposit by sputtering, vapor deposition, or plating, two or more alternate layers approximately 0.2 mil of equal thickness of gold 2, then copper 3. The specimen is then heated between 900° C. to 1100° C. to melt the surface layers and then cooled to solidify the surface alloy or is diffusion annealed at between 400° C. for 5 days or 750° C. for 20 minutes to homogenize the surface layers to the CuAu composition. The alloy is then ordered by heating between 200° C. for 15 days or 390° C. for 2 hours and quenching. Polishing will then develop the full reflectance.

Figure 6B:
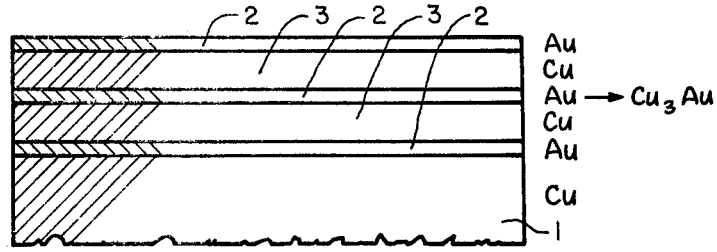
FIG. 6B is an elevational view illustrating a variation of the third embodiment of the invention.

Example IIIB: Follow the same procedure as in Example IIIA except deposit on a copper substrate 1 the layers of $Cu_3$ and $Au_2$ to thicknesses having a ratio of Cu/Au = 3 as shown in FIG. 6B, thereby forming a $Cu_3Au$ structure.

Figure 7:
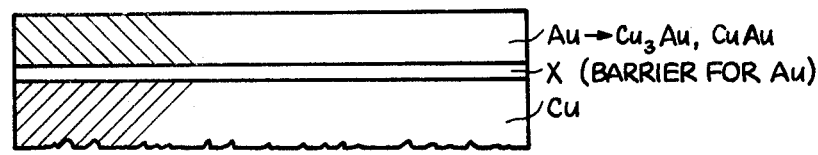
FIG. 7 is an elevational view illustrating a fourth embodiment of the invention.

Example IV: The same procedure is followed as in Examples II, IIIA or IIIB, except that as shown in FIG. 7, a metal film "X" such as nickel which forms a barrier for Au is also first deposited on the copper mirror surface through which only copper can easily diffuse to alloy with a gold layer, subsequently deposited to form either a $Cu_3Au$ or CuAu alloy for subsequent ordering to a reflective surface.

In all the above examples, the copper may first be heat treated for recrystallization and grain growth to produce a large grain surface of improved reflectivity over a fine grain. The subsequent deposited layers would then be of a large grain and higher reflectivity.

I claim:

1. A highly reflective laser mirror having high thermal conductivity comprising:
   a. a polished copper substrate, and
   b. a layer of copper-gold alloy which has been heat-treated and quenched to transform said layer into a face-centered cubic lattice structure in which the copper and gold atoms are ordered in certain lattice positions.

2. The mirror of claim 1 wherein a metal film forming a barrier for gold is deposited between said substrate and layer.

3. The mirror of claim 2 wherein said metal film is of nickel.

4. The mirror of claim 1 wherein said layer is of CuAu alloy in which the Cu atoms are positioned at the centers of the faces of said face-centered cubic lattice structures and the Au atoms are positioned at the remaining lattice sites to preserve the 1 Cu to 1 Au atom stochiometric relationship of said layer.

5. The mirror of claim 1 wherein said layer is of $Cu_3Au$ alloy in which the Au atoms are positioned at the corners of said face-centered cubic lattice structures and the Cu atoms are positioned at the centers of the faces thereof to preserve the 3 Cu to 1 Au atom stochiometric relationship.

6. A method for forming a highly reflective laser mirror having high thermal conductivity comprising the steps of:
   a. highly polishing the surface of a copper substrate,
   b. depositing on the substrate surface a thin layer of material selected from the class consisting of Au, CuAu and $Cu_3Au$ alloy,
   c. heating the substrate and layer to develop an ordered state of the material and
   d. cooling the substrate and layer to form a face-centered cubic lattice structure on the surface of the layer.

7. The method of claim 6 wherein the layer surface is finally polished for maximum reflectivity.

8. The method of claim 7 wherein the layer is of $Cu_3Au$ alloy.

9. The method of claim 6 wherein the layer is of CuAu alloy.

10. The method of claim 6 wherein the layer is of gold and the substrate and layer are heated at a high enough temperature for sufficient time to diffuse the gold into the copper, thereby forming a surface layer of copper-gold alloy.

11. The method of claim 6 wherein alternate layers of gold and copper are deposited on the substrate, the unit being diffusion annealed to homogenize the layers into a copper-gold alloy.

12. The method of claim 11 wherein the thicknesses of the layers are substantially equal to each other, whereby the layers are homogenized into a CuAu alloy.

13. The method of claim 11 wherein the ratio of the thicknesses of the copper to the gold layers is 3:1, whereby the layers are homogenized into a $Cu_3Au$ alloy.

14. The method of claim 6 wherein said layer is of gold and a thin layer of material, which forms a barrier for gold but through which copper can easily diffuse, is deposited between the surface of the substrate and said gold layer.

15. The method of claim 14 wherein the layer deposited between the gold layer and the substrate is of nickel.

* * * * *